(12) United States Patent
Ryu

(10) Patent No.: US 7,529,328 B2
(45) Date of Patent: May 5, 2009

(54) APPARATUS AND METHOD FOR ESTIMATING A DOPPLER FREQUENCY AND A MOVING VELOCITY OF A WIRELESS TERMINAL

(75) Inventor: Kil-Hyen Ryu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 612 days.

(21) Appl. No.: 11/167,833

(22) Filed: Jun. 27, 2005

(65) Prior Publication Data

US 2005/0286666 A1    Dec. 29, 2005

(30) Foreign Application Priority Data

Jun. 28, 2004    (KR) .................. 10-2004-0049063

(51) Int. Cl.
*H04B 1/10* (2006.01)
(52) U.S. Cl. .................................... 375/350
(58) Field of Classification Search ............. 375/150, 375/340, 350
See application file for complete search history.

(56) References Cited

U.S. PATENT DOCUMENTS

| | | | | |
|---|---|---|---|---|
| 4,137,532 A * | 1/1979 | Taylor et al. | ............... | 342/93 |
| 5,016,017 A * | 5/1991 | Kodera et al. | ............... | 342/106 |
| 5,577,022 A * | 11/1996 | Padovani et al. | ............ | 370/332 |
| 5,764,687 A * | 6/1998 | Easton | ................... | 375/147 |
| 6,061,021 A | 5/2000 | Zibell | | |
| 6,477,214 B1 * | 11/2002 | Fowler et al. | ............... | 375/350 |
| 6,563,861 B1 * | 5/2003 | Krasny et al. | ............... | 375/150 |
| 6,636,574 B2 | 10/2003 | Mallette et al. | | |
| 6,765,953 B1 * | 7/2004 | Harms et al. | ................ | 375/150 |
| 7,197,064 B2 * | 3/2007 | Loomis et al. | ............... | 375/148 |
| 7,327,799 B2 * | 2/2008 | Matsumoto | ................ | 375/267 |
| 2001/0014116 A1 * | 8/2001 | Saito et al. | .................. | 375/148 |
| 2002/0110103 A1 * | 8/2002 | Jung | ........................ | 370/335 |
| 2003/0081658 A1 * | 5/2003 | Messier et al. | ............. | 375/147 |
| 2003/0149711 A1 | 8/2003 | Lee et al. | | |
| 2003/0174666 A1 * | 9/2003 | Wallace et al. | ............. | 370/324 |
| 2004/0125771 A1 * | 7/2004 | Subrahmanya | .............. | 370/332 |
| 2005/0101272 A1 * | 5/2005 | Rowitch et al. | .......... | 455/161.2 |
| 2005/0125152 A1 * | 6/2005 | Fuchs et al. | ................ | 701/213 |
| 2005/0243897 A1 * | 11/2005 | Lomp et al. | ................ | 375/146 |

FOREIGN PATENT DOCUMENTS

JP    2002-141836    5/2002

* cited by examiner

*Primary Examiner*—David C Payne
*Assistant Examiner*—Leon-Viet Q Nguyen
(74) *Attorney, Agent, or Firm*—F. Chau & Associates, LLC

(57) ABSTRACT

An apparatus and method for estimating a Doppler frequency and a moving velocity of a wireless terminal are disclosed. The Doppler frequency estimator includes a filter bank, a non-coherent accumulator, and a maximum value detector. The filter bank filters demodulated signals with respect to frequency bands to provide a plurality of filtered signals. The non-coherent accumulator executes a non-coherent accumulation on each of the filtered signals to provide accumulated signals. The maximum value detector detects a signal having a largest value of the accumulated signals to provide a center frequency of a band corresponding to the detected signal as a Doppler frequency.

10 Claims, 6 Drawing Sheets

APPARATUS AND METHOD FOR ESTIMATING A DOPPLER FREQUENCY AND A MOVING VELOCITY OF A WIRELESS TERMINAL

CROSS-REFERENCE TO RELATED APPLICATION

This application claims priority to Korean Patent Application No. 2004-49063, filed on Jun. 28, 2004, the contents of which are herein incorporated by reference in their entirety.

TECHNICAL FIELD

The present invention relates to a wireless communication system, and more particularly, to an apparatus and method for estimating a Doppler frequency and a moving velocity of a wireless terminal in the wireless communication system.

DESCRIPTION OF THE RELATED ART

In wireless communication systems, the transmission channel of a signal varies over time. The transmission channel of a signal also varies with a moving velocity of a wireless terminal in the wireless communication systems. This may have a significant influence on the performance of such wireless communication systems. Generally, this varying effect is called a Doppler shift or Doppler spread.

The moving velocity of the wireless terminal can be estimated by calculating the amount of variation in a Doppler frequency. Estimating the moving velocity of a wireless terminal by using the amount of variation in the Doppler frequency has certain advantages as described below.

First, the modulation performance of a receiver terminal can be enhanced. In other words, because the state of a channel can be determined by measuring the velocity of a wireless terminal, the optimum coefficients of filters used in the receiver terminal when the channel is varied, can be obtained and used in a demodulation process.

Second, the cut-off of a phone call in a handover area of a wireless communication system having a hierarchical cell structure can be prevented. In other words, frequent handovers can be prevented by assigning a macro cell to a terminal moving at a high speed, and assigning a micro cell or pico cell to a terminal moving at a low speed.

Third, a high speed data service can be assigned to the low speed terminal and a low speed data service can be assigned to the high speed terminal by managing cell resources in a wireless communication system.

FIG. 1 is a block diagram showing a conventional Doppler frequency estimator 20 as disclosed in U.S. Pat. No. 6,563,861.

Referring to FIG. 1, the Doppler frequency estimator 20 includes a multiplier 26, a low pass filter 28, a processing block 30, a processing block 32, and a maximum function block 34. The multiplier 26 receives sampled received signals $r_n$ and multiplies the received signals $r_n$ with a complex conjugate $d_n^*$ of a transmitted signal. The low pass filter 28 receives the output of the multiplier 26 and reduces statistical errors and band noise. The output of the low pass filter 28 is inputted to the processing block 30 which estimates a spectral density of the output of the low pass filter 28.

The processing block 32 is a multi-channel correlator that generates likelihood ratio metrics. Each channel of the multi-channel correlator 32 calculates correlations in the frequency domain between a spectral estimate and waiting function. The likelihood ratio metrics are compared with each other and the output of the multi-channel correlator 32 is inputted to the maximum function block 34. On the basis of the comparisons between the likelihood ratio metrics, the multi-channel correlator 32 generates a Doppler spread fd(m) when an m-th channel has the maximum output value among the output of the multi-channel correlator 32.

The Doppler frequency estimator 20 of U.S. Pat. No. 6,563,861 calculates the spectral density of incoming signals using a Fast Fourier Transform (FFT), and then calculates correlations between the spectral density of the incoming signals and Doppler spread signals to output the maximum value among the outputs of the channels as a Doppler spread, e.g., a Doppler frequency. U.S. Pat. No. 6,636,574 discloses a Doppler frequency estimator where the Doppler frequency shift is calculated using an auto-correlation or auto-covariance. However, the Doppler frequency estimators of U.S. Pat. Nos. 6,563,861 and 6,636,574 require many operations for estimating the Doppler frequency.

SUMMARY OF THE INVENTION

It is a feature of the present invention to provide a Doppler frequency estimator and a method of estimating a Doppler frequency. It is another feature of the present invention to provide an apparatus for estimating a moving velocity of a wireless terminal and a method of estimating the moving velocity of the wireless terminal.

An exemplary embodiment of the present invention provides an apparatus for estimating a Doppler frequency and moving velocity of a wireless terminal. The apparatus includes a filter bank, a non-coherent accumulator, and a maximum value detector. The filter bank receives demodulated signals and filters the demodulated signals with respect to a plurality of frequency bands to provide a plurality of filtered signals. The non-coherent accumulator executes a non-coherent accumulation on each of the filtered signals to provide a plurality of accumulated signals. The maximum value detector detects a signal having a largest value of the accumulated signals to provide a center frequency of a frequency band corresponding to the detected signal as a Doppler frequency. The modulated signals may be signals generated from demodulating incoming signals through an antenna, or signals generated from demodulating pilot signals.

The non-coherent accumulator may include a square operation unit and an accumulation unit. The square operation unit executes a square operation on each of the filtered signals to provide a plurality of squared signals. The accumulation unit executes an accumulation operation on each of the squared signals in data blocks inputted into the accumulation unit for a predetermined time to provide the accumulated signals.

In an apparatus for estimating a Doppler frequency and moving velocity of a wireless terminal according to an exemplary embodiment of the present invention, a moving velocity of a terminal may be calculated using an equation of $Vd=fd/fc \times C$, where $Vd$ denotes a moving velocity of the terminal, $fd$ denotes a Doppler frequency, $fc$ denotes a carrier frequency, and $C$ denotes a velocity of an electromagnetic wave.

Another exemplary embodiment of the present invention provides a method of estimating a Doppler frequency and moving velocity of a wireless terminal. The method includes a step of filtering demodulated signals with respect to a plurality of frequency bands to provide a plurality of filtered signals, a step of executing a non-coherent accumulation on each of the filtered signals to provide a plurality of accumulated signals, and a step of detecting a signal having a largest value among the accumulated signals to provide a center frequency of a frequency band corresponding to the detected signal as a Doppler frequency.

Still another exemplary embodiment of the present invention provides an apparatus for estimating a Doppler frequency and moving velocity of a wireless terminal. The apparatus includes a band-pass filter unit, a non-coherent accumulator, a comparator, and a search control unit.

The band-pass filter unit performs a band-pass filtering operation on demodulated signals with respect to a modulo-2 search band to provide filtered signal pairs. The modulo-2 search band is divided into two parts. The non-coherent accumulator executes a non-coherent accumulation on each of the filtered signal pairs to provide non-coherent accumulated signal pairs. The comparator compares the non-coherent accumulated signal pairs with each other to provide a larger one of the non-coherent accumulated signal pairs as a detection signal. The search control unit iteratively generates control signals by narrowing a search band for a predetermined number of search periods to provide the control signals to the band-pass filter unit, and determines that a detection signal detected at a final search period is a Doppler frequency, wherein the control signals set an initial modulo-2 search band when a searching operation is initiated, and set a divided band corresponding to the detection signal among the initial modulo-2 search band as a modulo-2 search band of a next period.

In yet another apparatus for estimating a Doppler frequency and moving velocity of a wireless terminal according to an exemplary embodiment of the present invention, the moving velocity of a terminal may be calculated using an equation of Vd=fd/fc×C, where Vd denotes a moving velocity of the terminal, fd denotes a Doppler frequency, fc denotes a carrier frequency, and C denotes a velocity of an electromagnetic wave.

Another exemplary embodiment of the present invention provides a method of estimating a Doppler frequency and moving velocity of a wireless terminal. The method includes a step of performing a band-pass filtering operation on demodulated signals with respect to a modulo-2 search band to provide filtered signal pairs, a step of executing a non-coherent accumulation on each of the filtered signal pairs to provide non-coherent accumulated signal pairs, a step of comparing the non-coherent accumulated signal pairs with each other to provide a larger one of the non-coherent accumulated signal pairs as a detection signal, a step of iteratively generating control signals by narrowing a search band for a predetermined number of search periods to provide the control signals to the band-pass filter unit, and a step of determining that a detection signal detected at a final search period is a Doppler frequency. The control signals set an initial modulo-2 search band when a searching operation is initiated, and set a divided band corresponding to the detection signal among the initial modulo-2 search band as a modulo-2 search band of a next period.

The apparatus for estimating a Doppler frequency and moving velocity of a wireless terminal according to the exemplary embodiments of the present invention is able to quickly estimate the Doppler frequency and the velocity of a wireless terminal.

BRIEF DESCRIPTION OF THE DRAWINGS

The foregoing and other features of the invention will become apparent from the description of exemplary embodiments of the invention as illustrated in the accompanying drawings. The drawings are not necessarily to scale, instead, emphasis is placed upon illustrating the principles of the invention. Like reference characters refer to like elements throughout the drawings and accompanying description.

DESCRIPTION OF EXEMPLARY EMBODIMENTS

Exemplary embodiments of the present invention are disclosed herein. However, specific structural and functional details disclosed herein are merely represented for purposes of describing the exemplary embodiments of the present invention.

Figure 1:
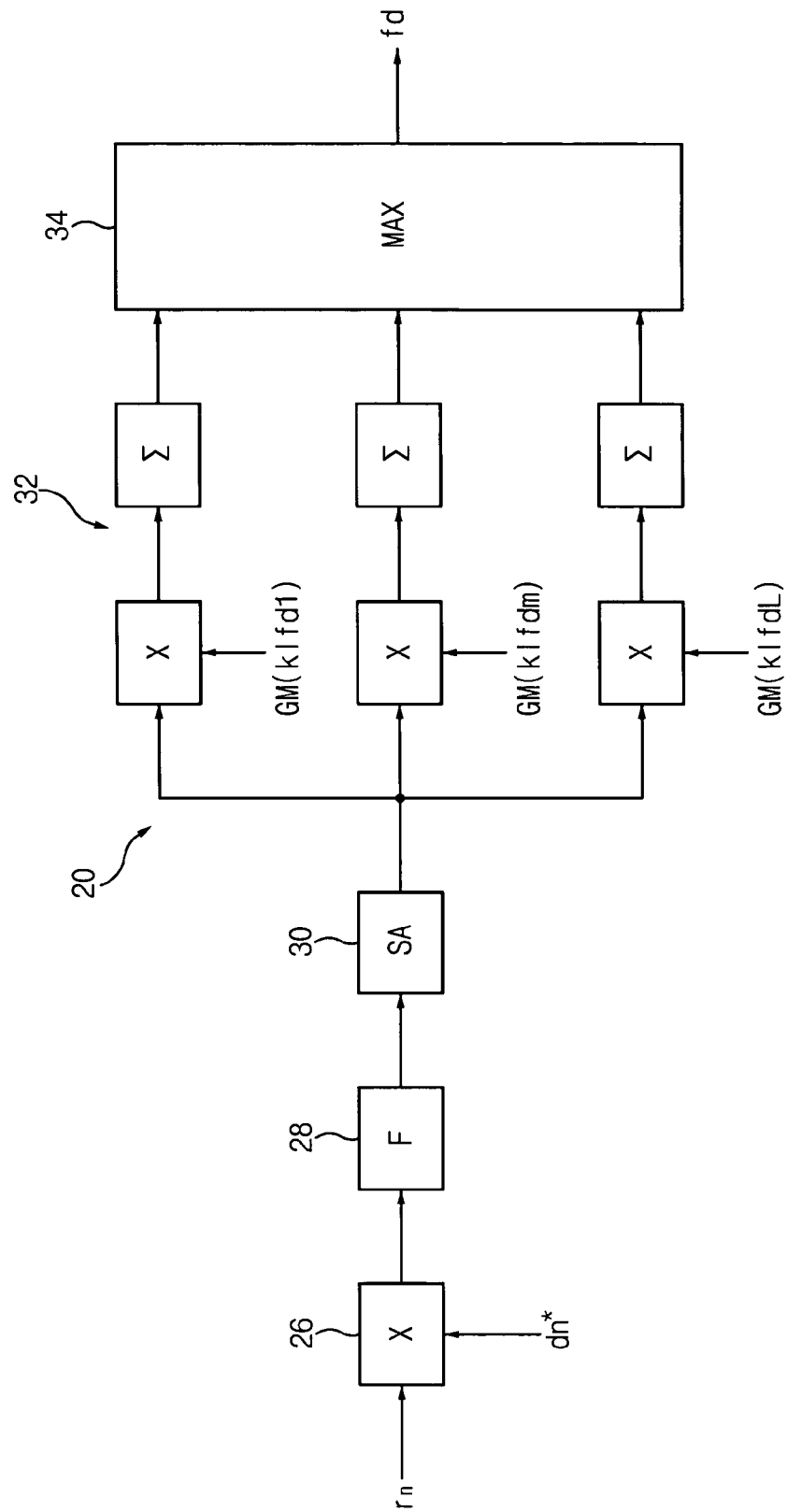
FIG. 1 is a block diagram showing a conventional Doppler frequency estimator.
Figure 2:
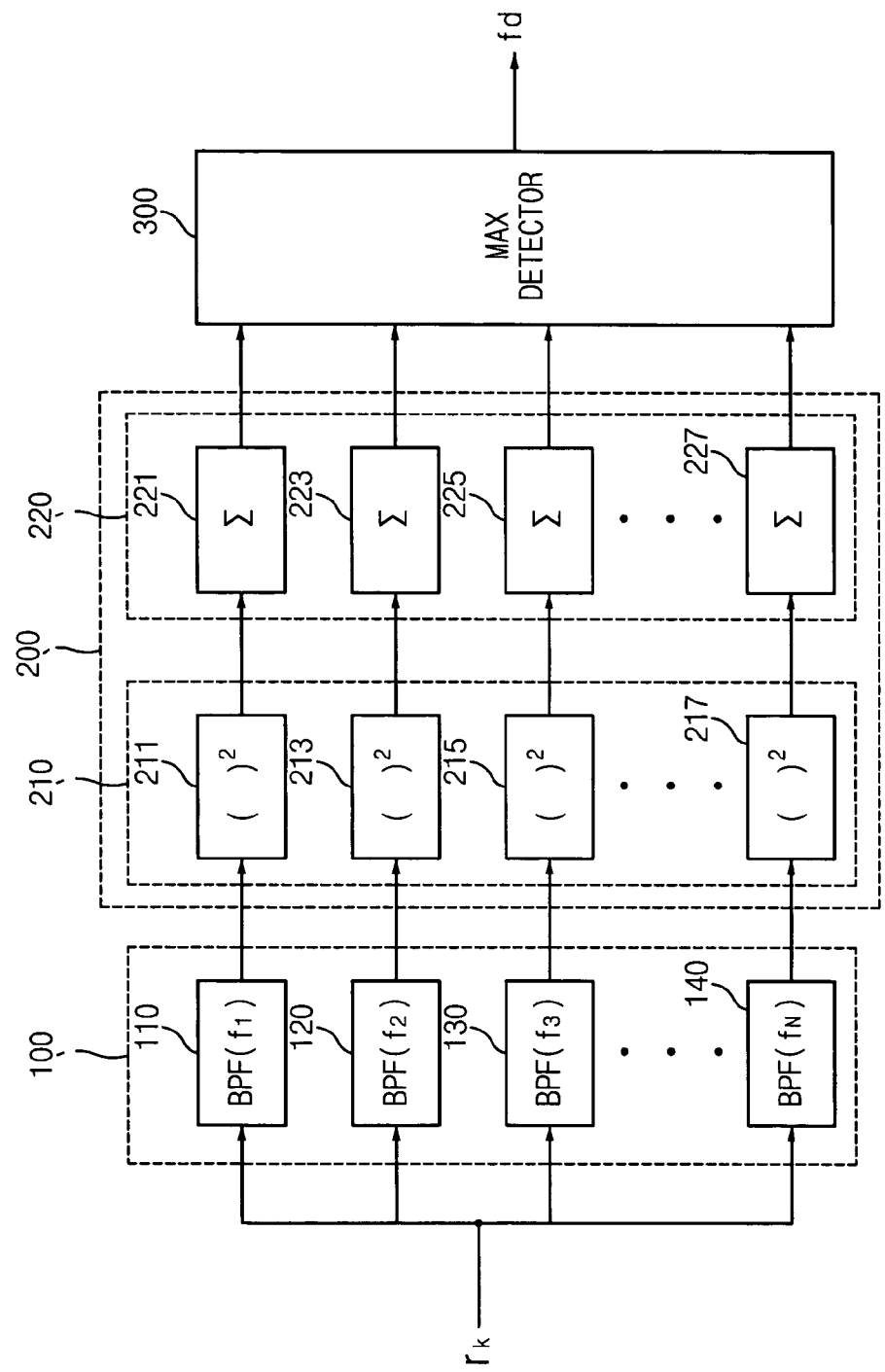
FIG. 2 is a block diagram showing a Doppler frequency estimator according to an exemplary embodiment of the present invention.

FIG. 2 is a block diagram showing a Doppler frequency estimator according to an exemplary embodiment of the present invention.

Referring to FIG. 2, the Doppler frequency estimator includes a filter bank 100, a non-coherent accumulator 200, and a maximum value detector 300.

The filter bank 100 is comprised of band-pass filters 110, 120, 130 . . . 140, respectively having different center frequencies $f_1$ through $f_N$. The non-coherent accumulator 200 includes a square operation unit 210 comprised of square operation devices 211, 213, 215 . . . 217, and an accumulation unit 220 comprised of accumulators 221, 223, 225 . . . 227.

The filter bank 100 receives demodulated signals $r_k$ and filters the demodulated signals $r_k$ with respect to a plurality of frequency bands to generate filtered signals corresponding to each of the frequency bands.

The non-coherent accumulator 200 executes a non-coherent accumulation on each of the filtered signals in data blocks inputted into the non-coherent accumulator 200 for a predetermined time to output accumulated signals.

The square operation unit 210 executes a square operation on each of the filtered signals to output squared signals. The accumulation unit 220 executes an accumulation operation on each of the squared signals in data blocks inputted to the accumulation unit 220 for a predetermined time to output the accumulated signals.

The maximum value detector 300 detects a signal having a largest value among the accumulated signals to output a center frequency of a frequency band corresponding to the detected signal as a Doppler frequency (fd).

Figure 3A:
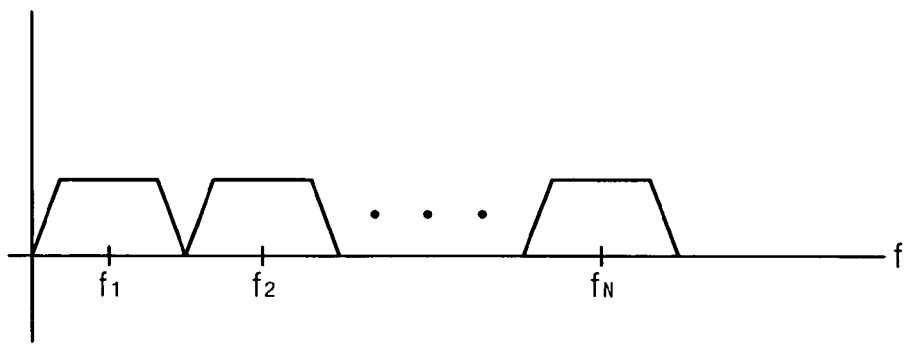
FIG. 3A and FIG. 3B are schematic diagrams showing frequency response characteristics of a filter bank in the Doppler frequency estimator of FIG. 2.
Figure 3B:
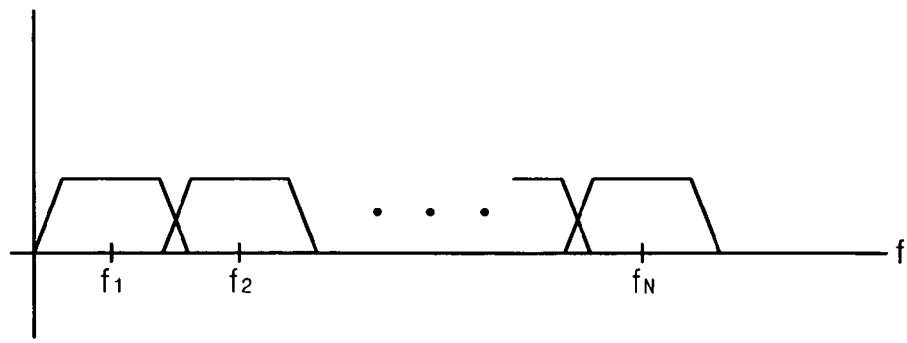

FIG. 3A and FIG. 3B are schematic diagrams showing frequency response characteristics of a filter bank in the Doppler frequency estimator of FIG. 2.

Hereinafter, when referring to FIG. 3A and FIG. 3B, the Doppler frequency estimator of FIG. 2 will be described.

Each of the band-pass filters 110, 120, 130 . . . 140 of the Doppler frequency estimator has a center frequency corresponding to each of the Doppler frequencies $f_1$ through $f_N$ to be measured. In FIG. 2, the demodulated signals $r_k$ may be signals generated by demodulating incoming signals received through an antenna or signals generated by demodulating pilot signals with a constant pattern.

The demodulated signals $r_k$ are filtered with respect to a plurality of frequency bands by the band-pass filters 110, 120, 130 . . . 140 respectively having different center frequencies $f_1$ through $f_N$.

A non-coherent accumulation operation is performed on data blocks, which are inputted into the non-coherent accumulator 200 for a predetermined time, and the signals filtered by the band-pass filters 110, 120, 130 . . . 140. The accumulated value in the non-coherent accumulator 200 corresponds to an averaged value for a certain time. The time average is performed to make a Doppler frequency estimator robust in view of noise during a short period. Therefore, the output signal of a filter having a center frequency nearest the Doppler frequency of the wireless channel through which a signal passes has the largest value, and the output signals of the other filters are relatively small.

In the maximum value detector 300, the output signal having the largest value among the output signals of the non-coherent accumulator 200 is detected, and the center frequency of a frequency band corresponding to the detected output signal is outputted as a Doppler frequency.

In more detail, FIG. 3A is a diagram showing frequency response characteristics of a filter bank when an aliasing effect does not exist, and FIG. 3B is a diagram showing the frequency response characteristics of a filter bank when the aliasing effect exists.

Referring to FIG. 3A, the filter bank has a number of N bands respectively having different center frequencies $f_1$ through $f_N$. Referring to FIG. 3B, the filter bank has a number of N bands respectively having different center frequencies $f_1$ through $f_N$, and the N bands are slightly overlapped. The Doppler frequency estimator shown in FIG. 2 compares the relative magnitude of the output of the filters to calculate the Doppler frequency (fd) even though some aliasing exists as shown in FIG. 3B.

After finding the Doppler frequency (fd) using the Doppler frequency estimator shown in FIG. 2, the moving velocity of the terminal can be calculated using expression 1 shown below.

$$Vd = \frac{fd}{fc} C, \qquad <\text{Expression 1}>$$

where Vd denotes a moving velocity of the terminal, fd denotes a Doppler frequency, fc denotes a carrier frequency, and C denotes a velocity of an electromagnetic wave (about $3 \times 10^8$ m/s).

Figure 4:
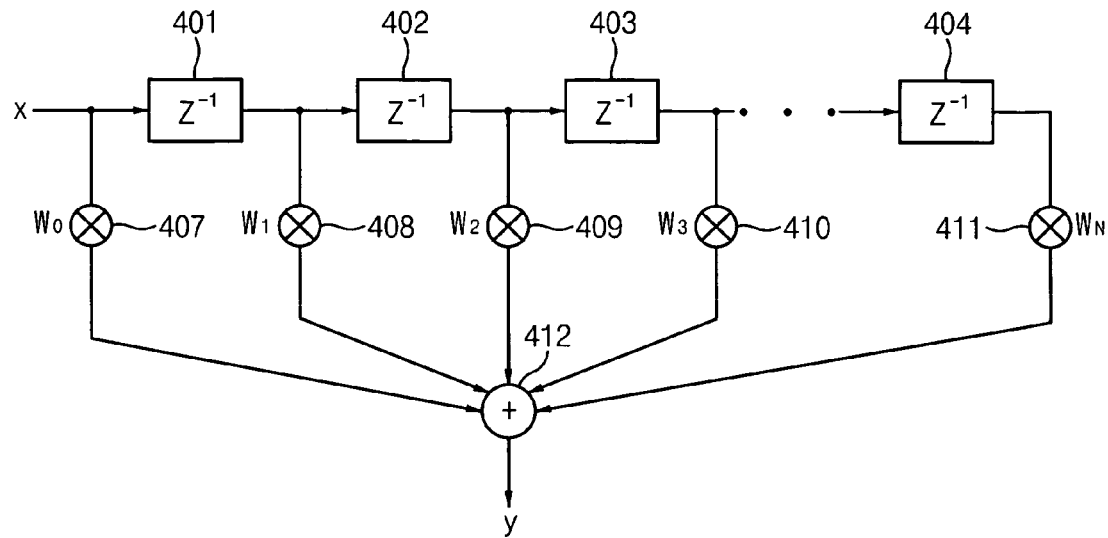
FIG. 4 is a schematic diagram showing a Finite Impulse Response (FIR) filter as one of the filters in the Doppler frequency estimator of FIG. 2.
Figure 5:
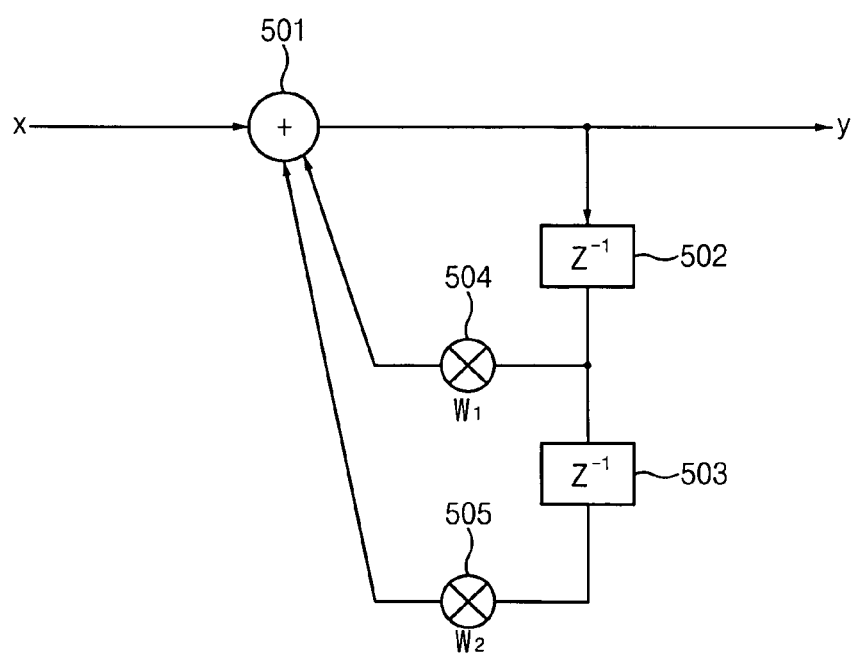
FIG. 5 is a schematic diagram showing a Infinite Impulse Response (IIR) filter as one of the filters in the Doppler frequency estimator of FIG. 2.

FIG. 4 is a schematic diagram showing a Finite Impulse Response (FIR) filter as one of the filters in the Doppler frequency estimator of FIG. 2, and FIG. 5 is a schematic diagram showing an Infinite Impulse Response (IIR) filter as one of the filters in the Doppler frequency estimator of FIG. 2. Because the FIR filter and the IIR filter are well-known in the signal processing area they will not be explained hereinafter.

As shown in FIG. 4 and FIG. 5, $W_0$ through $W_N$ denote the coefficients of filters, x denotes the input signal of the filter, y denotes the output signal of the filter, and $Z^{-1}$ denotes a delay element. When a band-pass filter is constructed using the IIR filter, the circuit is simpler as compared with a band-pass filter constructed using the FIR filter.

The transfer function of the IIR filter of FIG. 5 may be expressed by expression 2 shown below.

$$\frac{Y(Z)}{X(Z)} = \frac{1}{1 - W_1 Z^{-1} - W_2 Z^{-2}} \qquad <\text{Expression 2}>$$

Figure 6:
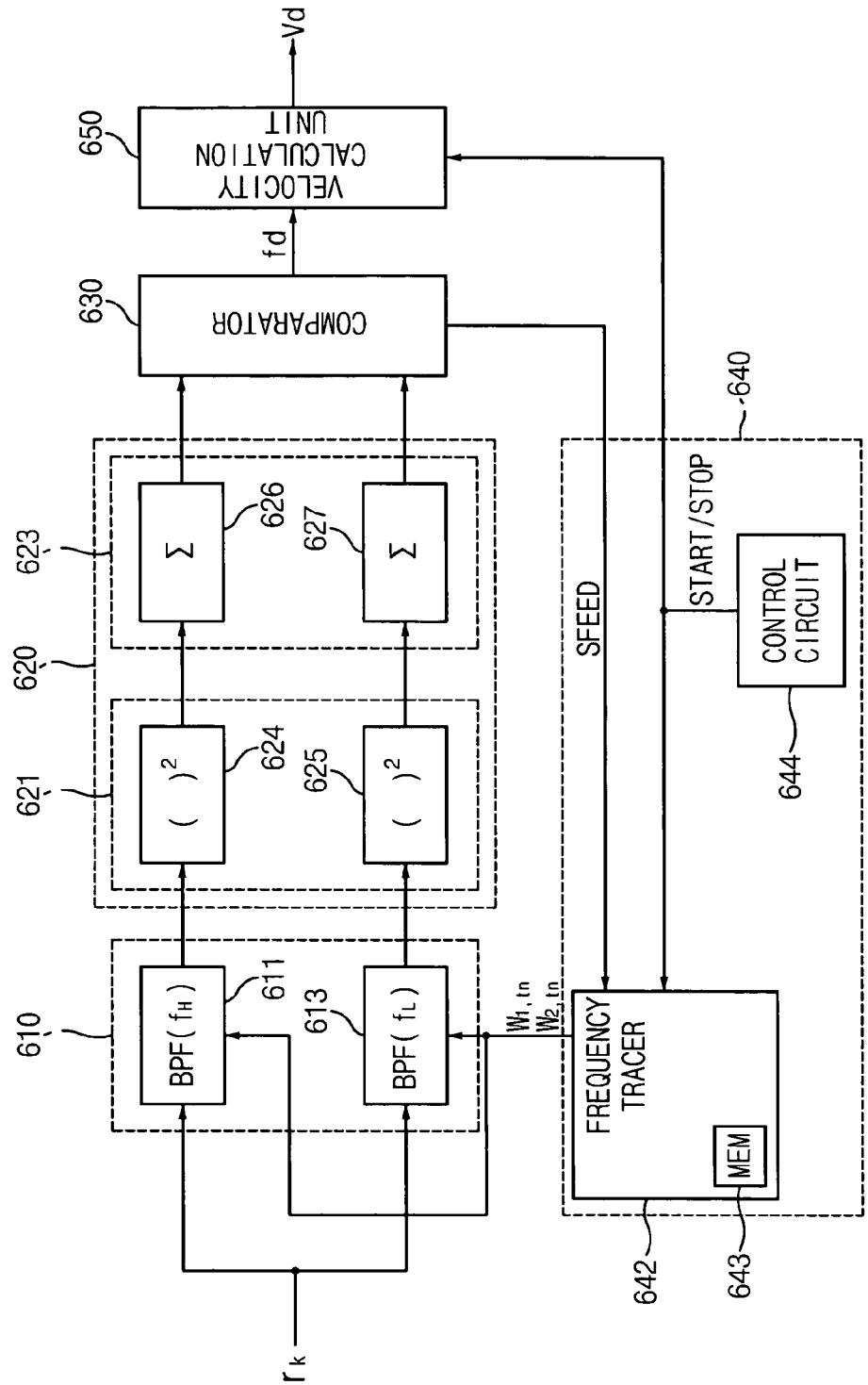
FIG. 6 is a block diagram showing a Doppler frequency estimator according to another exemplary embodiment of the present invention.

FIG. 6 is a block diagram showing a Doppler frequency estimator according to another exemplary embodiment of the present invention.

Referring to FIG. 6, the Doppler frequency estimator includes a band-pass filter unit 610, a non-coherent accumulator 620, a comparator 630, a search control unit 640, and a velocity calculation unit 650.

The band-pass filter unit 610 is comprised of band-pass filters 611 and 613, respectively having different center frequencies $f_H$ and $f_L$. The non-coherent accumulator 620 includes a square operation unit 621 comprised of square operation devices 624 and 625, and an accumulation unit 623 comprised of accumulators 626 and 627. The search control unit 640 includes a frequency tracer 642 and a control circuit 644. The frequency tracer 642 includes a memory 643.

The band-pass filter unit 610 performs a band-pass filtering operation on the demodulated signals $r_k$ in a modulo-2 search band to generate filtered signal pairs. The modulo-2 search band is a search band that is divided into two parts.

The non-coherent accumulator 620 executes a non-coherent accumulation on each of the filtered signal pairs to output non-coherent accumulated signal pairs. The square operation unit 621 executes a square operation on each of the filtered signal pairs to output squared signal pairs. The accumulation unit 623 executes an accumulation operation on each of the squared signal pairs in data blocks inputted into the accumulation unit 623 for a predetermined time to output the non-coherent accumulated signal pairs. The comparator 630 compares the non-coherent accumulated signal pairs with each other to output a larger one of the non-coherent accumulated signal pairs as a detection signal (fd).

The frequency tracer 642 in the search control unit 640 generates control signals $W_{1,m}$ and $W_{2,m}$ that set an initial modulo-2 search band when searching is initiated, and set a divided band corresponding to the detection signal among the initial modulo-2 search band as a modulo-2 search band of a next period.

The search control unit 640 iteratively generates the control signals for a predetermined number of search periods to narrow a search band. Further, the search control unit 640 determines that a detection signal detected at a final search period is a Doppler frequency and finishes the search operation.

The control circuit 644 generates a START/STOP signal to start or stop the operations of the frequency tracer 642 and the velocity calculation unit 650. The velocity calculation unit 650 calculates the velocity of a terminal using expression 1, e.g., Vd=fd/fc×C, where Vd denotes a moving velocity of the terminal, fd denotes a Doppler frequency, fc denotes a carrier frequency, and C denotes a velocity of an electromagnetic wave.

Figure 7:
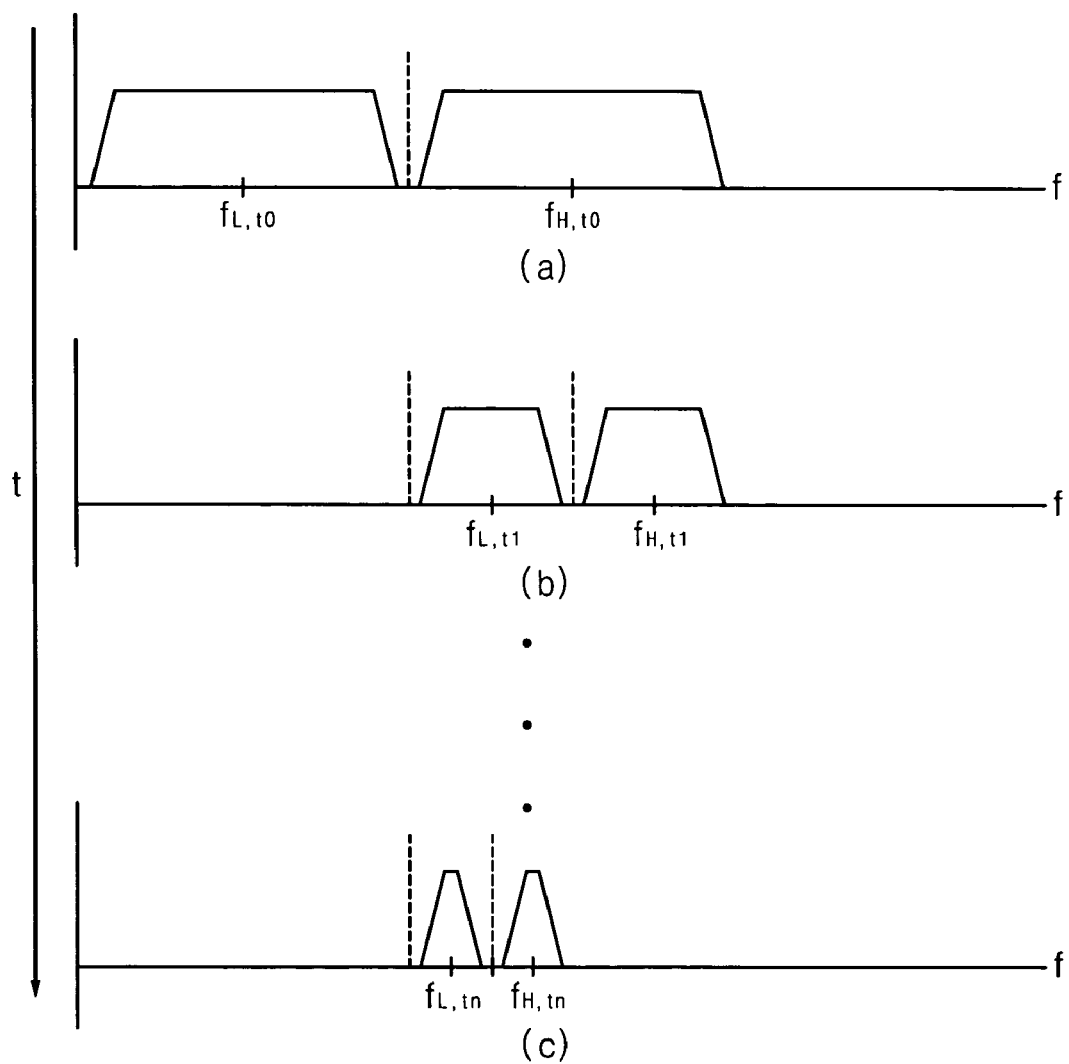
FIG. 7 is a diagram showing a method for calculating the Doppler frequency using the Doppler frequency estimator of FIG. 6.

FIG. 7 is a diagram showing a method for calculating a Doppler frequency using the Doppler frequency estimator of FIG. 6.

In general, the velocity of a wireless terminal is less than about 500 Hz. Therefore, the amount of variation in velocity of a wireless terminal can be estimated using the band-pass filter unit 610 comprised of the two band-pass filters 611 and 613.

The signals that a Doppler frequency estimator receives may be signals generated from demodulating incoming signals received through an antenna, or signals generated from demodulating pilot signals with a constant pattern. These signals undergo a Doppler shift as wireless channels vary. The band-pass filters 611 and 613 respectively having different center frequencies $f_H$ and $f_L$ and filter the demodulated signals $r_k$ with respect to a plurality of frequency bands.

A non-coherent accumulation operation is performed on data blocks, which are inputted into the non-coherent accumulator 620 for a predetermined time, and the signals filtered by the band-pass filters 611 and 613 by the non-coherent accumulator 620. The accumulated value in the non-coherent accumulator 620 corresponds to an averaged value for a certain time. The time average is performed to make a Doppler frequency estimator robust in view of noise during a short period.

The Doppler frequency estimator of FIG. 6 employs the two band-pass filters 611 and 613, and includes the comparator 630 and the search control unit 640. During a first trial, the demodulated signals $r_k$ are applied to the two band-pass filters 611 and 613. As shown in (a) of FIG. 7, a upper band whose center frequency is $f_H$ and a lower band whose center frequency is $f_L$ exist, where $f_H$ denotes the center frequency of the upper band-pass filter 611 and $f_L$ denotes the center frequency of the lower band-pass filter 613.

Accordingly, during the first trial, the band-pass filters 611 and 613 have relatively wide bandwidths. These bandwidths are determined by the filter coefficients in the transfer function of the IIR filter mentioned above. The frequency tracer 642 selects the filter coefficients from the memory 643 to provide the selected filter coefficients to the band-pass filters 611 and 613 according to a feedback signal SFEED. The feedback signal SFEED is generated in response to the larger of the two signals, e.g., the accumulated signals of the output signals of the two filters 611 and 613 accumulated by the non-coherent accumulator 620.

During a second trial, the band-pass filters 611 and 613 perform a band-pass filtering operation on the modulated signals $r_k$ with respect to a plurality of frequency bands using the changed filter coefficients. As shown in (b) of FIG. 7, during the second trial, the upper band is divided by two and two bands having new center frequencies ($f_L$,t1; $f_H$,t2) are generated. Accordingly, during the second trial, the filters have bandwidths half the bandwidth of those during the first trial.

Thus, the Doppler frequency estimator according to this exemplary embodiment compares the accumulated values each other, changes the filter coefficients and outputs the larger of the two.

The search control unit 640 then determines that a detection signal detected at a final search period is a Doppler frequency (fd) and finishes the search operation. The control circuit 644 generates a START/STOP signal to start or stop the operations of the frequency tracer 642 and the velocity calculation unit 650.

While the exemplary embodiments of the present invention have been described in detail, it should be understood that various changes, substitutions and alterations can be made herein without departing from the scope of the invention as defined by appended claims.

What is claimed is:

1. A Doppler frequency estimator, comprising:
   a band-pass filter unit configured to perform a band-pass filtering operation on demodulated signals with respect to a modulo-2 search band to provide filtered signal pairs;
   a non-coherent accumulator configured to execute a non-coherent accumulation on each of the filtered signal pairs to provide non-coherent accumulated signal pairs;
   a comparator configured to compare the non-coherent accumulated signal pairs with each other to provide a larger one of the non-coherent accumulated signal pairs as a detection signal; and
   a search control unit configured to iteratively generate control signals for a predetermined number of search periods to provide the control signals to the band-pass filter unit, and configured to determine that a detection signal detected at a final search period is a Doppler frequency, wherein the control signals narrow a search band by setting an initial modulo-2 search band during an initial search period and setting a modulo-2 search band of a next search period,
   wherein the modulo-2 search band of the next search period is the initial modulo-2 search band divided in accordance with the detection signal such that a bandwidth of the modulo-2 search band of the next search period is less than a bandwidth of the initial modulo-2 search band.

2. The Doppler frequency estimator of claim 1, wherein the band-pass filter unit includes FIR-type filters.

3. The Doppler frequency estimator of claim 1, wherein the band-pass filter unit includes IIR-type filters.

4. The Doppler frequency estimator of claim 1, wherein the non-coherent accumulator comprises:
   a square operation unit configured to execute a square operation on each of the filtered signal pairs to provide squared signal pairs; and
   an accumulation unit configured to execute an accumulation operation on each of the squared signal pairs in data blocks inputted into the accumulation unit for a predetermined time to provide the accumulated signal pairs.

5. The Doppler frequency estimator of claim 1, wherein the modulated signals correspond to signals generated from one of demodulating incoming signals through an antenna and demodulating pilot signals.

6. The Doppler frequency estimator of claim 1, further comprising:
   a velocity calculation unit for estimating a moving velocity of a wireless terminal.

7. The Doppler frequency estimator of claim 6, wherein the moving velocity of the wireless terminal is calculated using Vd=fd/fc×C, where Vd denotes the moving velocity of the terminal, fd denotes the Doppler frequency, fc denotes a carrier frequency, and C denotes a velocity of an electromagnetic wave.

8. A method of calculating a Doppler frequency, comprising:
   performing in a band-pass filter unit a band-pass filtering operation on demodulated signals with respect to a modulo-2 search band to provide filtered signal pairs;
   executing a non-coherent accumulation on each of the filtered signal pairs to provide non-coherent accumulated signal pairs;
   comparing the non-coherent accumulated signal pairs with each other to provide a larger one of the non-coherent accumulated signal pairs as a detection signal;

generating control signals for a predetermined number of search periods to provide the control signals to a the band-pass filter unit; and determining that a detection signal detected at a final search period is a Doppler frequency, wherein the control signals narrow a search band by setting an initial modulo-2 search band during an initial search period and setting a modulo-2 search band of a next search period, wherein the modulo-2 search band of the next search period is the initial modulo-2 search band divided in accordance with the detection signal such that a bandwidth of the modulo-2 search band of the next search period is less than a bandwidth of the initial modulo-2 search band.

9. The method of claim 8, wherein the accumulated signals are provided by:
  executing a square operation on each of the filtered signals to provide squared signals; and
  executing an accumulation operation on each of the squared signals in data blocks inputted for a predetermined time to provide the accumulated signals.

10. The method of claim 8, further comprising:
estimating a moving velocity of a wireless terminal, wherein the moving velocity of the wireless terminal is calculated using $Vd=fd/fc \times C$, where Vd denotes the moving velocity of the terminal, fd denotes the Doppler frequency, fc denotes a carrier frequency, and C denotes a velocity of an electromagnetic wave.

* * * * *